United States Patent [19]

Sommer

[11] Patent Number: 5,186,288

[45] Date of Patent: * Feb. 16, 1993

[54] ELECTRO-SHEAR BRAKE

[75] Inventor: Gordon M. Sommer, Boca Raton, Fla.

[73] Assignee: Sommer Company, Warren, Mich.

[ * ] Notice: The portion of the term of this patent subsequent to May 1, 2007 has been disclaimed.

[21] Appl. No.: 516,096

[22] Filed: Apr. 27, 1990

Related U.S. Application Data

[62] Division of Ser. No. 157,925, Feb. 18, 1988, Pat. No. 4,921,078.

[51] Int. Cl.$^5$ .............................................. F16D 55/26
[52] U.S. Cl. .................................. 188/171; 188/264 E; 188/72.3
[58] Field of Search .................... 188/170, 171, 264 E, 188/264 CC, 71.5, 72.1, 72.3; 192/90

[56] References Cited

U.S. PATENT DOCUMENTS

| | | | |
|---|---|---|---|
| 2,025,098 | 12/1935 | Dudick | 188/171 |
| 2,077,888 | 4/1937 | Larsh | 188/171 |
| 2,215,909 | 9/1940 | McWhirter et al. | 188/171 |
| 2,262,352 | 11/1941 | Arnold et al. | 188/171 |
| 2,368,317 | 1/1945 | Meyer et al. | 188/171 |
| 2,410,183 | 10/1946 | Ray | 188/171 |
| 2,620,900 | 12/1952 | Du Rostu | 188/264 E |
| 2,884,107 | 4/1959 | Frankel | 188/171 |
| 3,680,666 | 8/1972 | Sommer | 188/171 |
| 3,753,182 | 8/1973 | Grove | 188/138 X |
| 3,983,971 | 10/1976 | Kawai | 192/90 X |
| 4,146,210 | 3/1979 | Koval et al. | 188/171 X |
| 4,415,067 | 11/1983 | Cory | 188/71.5 |
| 4,483,422 | 11/1984 | Cory | 188/71.5 |
| 4,606,444 | 8/1986 | Sekella | 188/171 X |
| 4,809,824 | 3/1989 | Fargier et al. | 188/72.1 X |
| 4,820,946 | 4/1989 | Gutbrod | 188/72.3 X |
| 4,821,847 | 4/1989 | Langdon et al. | 188/171 |
| 4,938,321 | 7/1990 | Kelley et al. | 188/171 |

FOREIGN PATENT DOCUMENTS

| | | |
|---|---|---|
| 2411922 | 9/1975 | Fed. Rep. of Germany . |
| 8701790 | 3/1987 | Fed. Rep. of Germany . |
| 2069849 | 9/1971 | France . |
| 2319232 | 2/1977 | France . |
| 2439907 | 5/1980 | France . |
| 779349 | 7/1957 | United Kingdom . |
| 796841 | 6/1958 | United Kingdom . |
| 816190 | 7/1959 | United Kingdom . |
| 890346 | 2/1962 | United Kingdom . |
| 965642 | 8/1964 | United Kingdom . |
| 1098574 | 1/1968 | United Kingdom . |

Primary Examiner—Robert J. Oberleitner
Assistant Examiner—Peter M. Poon
Attorney, Agent, or Firm—Harness, Dickey & Pierce

[57] ABSTRACT

A motor brake unit comprising a housing member defining a fluid chamber disposed about the motor shaft of a motor, a shaft sleeve disposed within the fluid chamber nestingly engaging the motor shaft for rotation therewith, a first plurality of brake elements rotatable with the shaft sleeve, a brake collar secured to the housing member and disposed annularly about the shaft sleeve, a second plurality of brake elements non-rotatably supported by the brake collar, a pole piece for selectively engaging and disengaging the brake elements, a coil spring for normally biasing the pole piece to engage the brake elements, and a plurality of electromagnetic coils for selectively attracting the pole piece axially opposite the biasing force to disengage the brake elements.

13 Claims, 2 Drawing Sheets

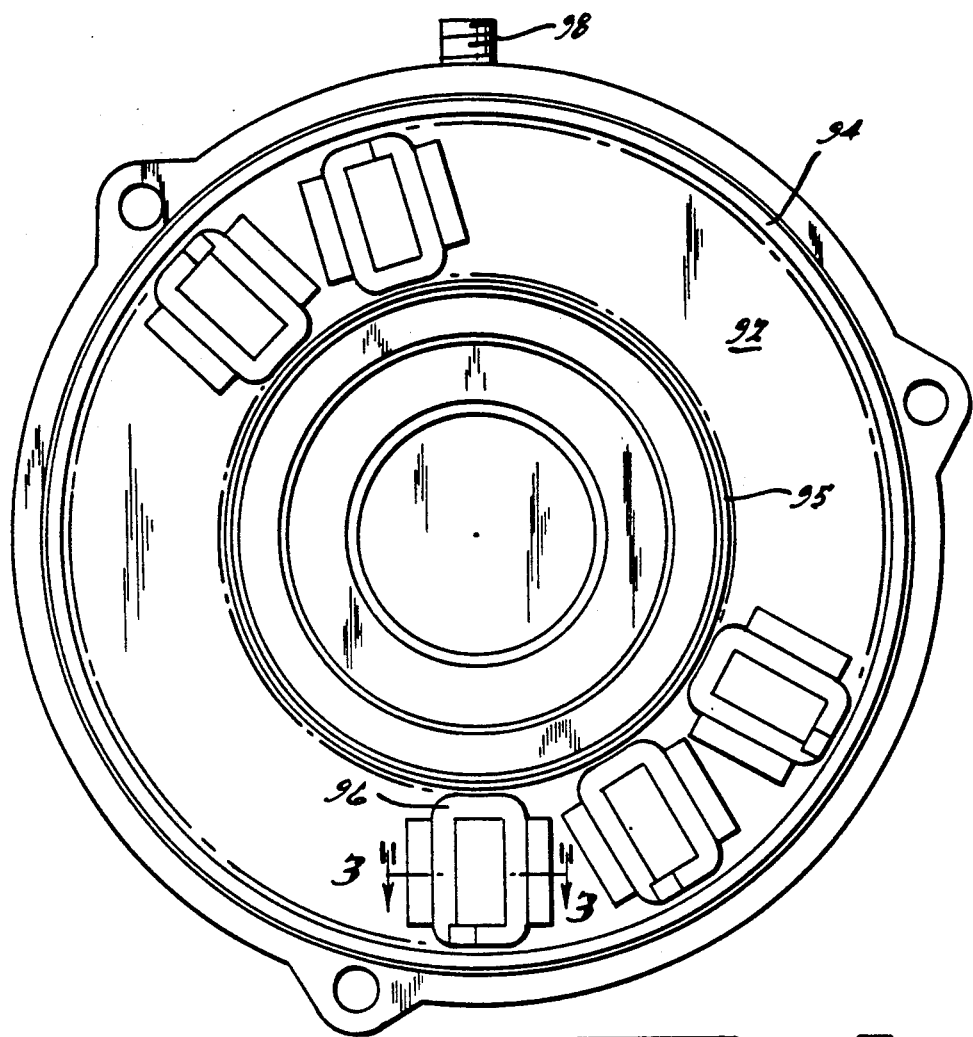
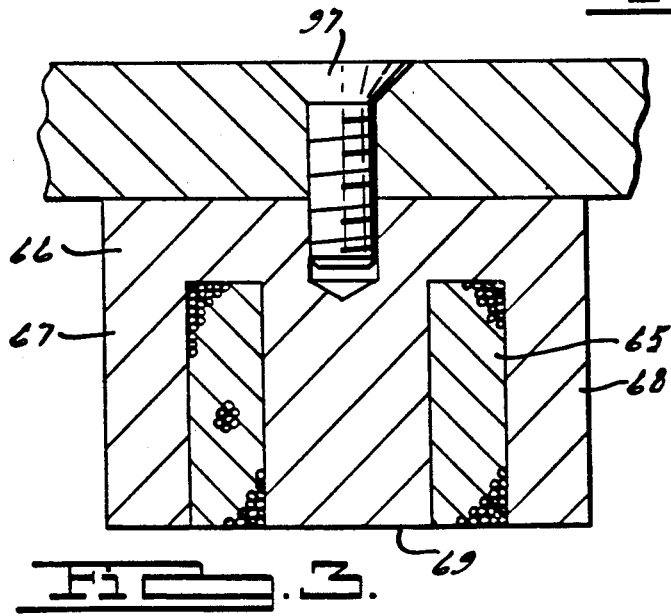
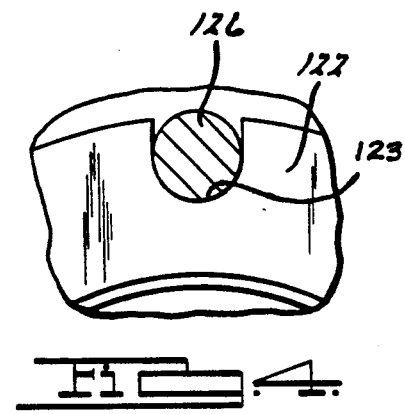

ELECTRO-SHEAR BRAKE

This is a division of U.S. patent application Ser. No. 157,925, filed Feb. 18, 1988, entitled "Electro-shear Brake" now U.S. Pat. No. 4,921,078, issued May 1, 1990.

BACKGROUND AND SUMMARY OF THE INVENTION

The present invention relates, generally, to a motor brake unit wherein the braking elements thereof are submerged in a cooling fluid medium which provides for maximum cooling and minimum wear, such as is disclosed in applicant's U.S. Pat. No. 3,680,666, issued Aug. 1, 1972, and more particularly, an electro-mechanically controlled motor brake unit.

In simple terms, the oil shear principle is based on the use of multiple disc packs bathed in oil. A positive oil film is maintained between the disc surfaces. Torque is transmitted by the viscous shearing of this oil film. The result is that the wear of friction surfaces is greatly reduced. Heat is dissipated by the circulating oil for fast cyclic capability.

The present invention avoids problems such as coolant infiltration, chips, glazing, erratic operation due to air pressure fluctuations, slow response and cycle times, costly maintenance, and other design and operational problems which are inherent with open to atmosphere brakes. The present invention is a totally enclosed, completely assembled unit that can be mounted directly to standard "C" faced motors, or to through-shaft applications.

In operation the present invention is cool and quiet, making it suitable for use in all areas where noise level is a concern, including manufacturing, medical, forestry, and other environments. The brake is also well suited for for mining, chemical, agriculture, and gas industries applications. Being impervious to water, the present invention is also suitable for food processing and marine applications.

The present invention minimizes required maintenance, reducing down-time and lost production due to brake failure. Further, production may increase due to the faster AC cycle rate of the brake, when compared to the slow response time of AC converted to DC brakes. The present invention does not require time delay relays or power supplies; its response is nearly instantaneous.

The present invention also minimizes extensive production loss during installation, or retro fitting. The brake is a totally enclosed, self-contained unit which fits standard motor mounts with mounting adapters. Special adapters can be utilized for non-standard mountings. The present invention is a compatible replacement for most electric and air actuated motor brakes.

The brake is simply installed, it is attached to the mount and AC power leads are attached from the motor starter to an in-line fuse block, and then to the brake.

It is accordingly an important object of the present invention to provide a new and improved motor brake unit that utilizes a plurality of friction discs which are submerged in an oil bath that functions to effectively transfer the heat created during a braking operation away from the discs.

It is still another object of the present invention to provide a new and improved motor brake unit of the above described character that can be operated at high speeds and at high cyclic rates.

It is yet another object of the present invention to provide a new and improved motor brake unit that is extremely small and compact in size.

It is yet another object of the present invention to provide a new and improved motor brake unit that may be completely preassembled and which is entirely sealed to the atmosphere so as to prevent the ingress of any dirt, dust or other foreign material therein.

Other objects and advantages of the present invention will become apparent from the following detailed description taken in conjunction with the accompanying drawings.

BRIEF DESCRIPTION OF THE DRAWINGS

FIG. 2 is a cross-sectional view of the motor brake shown in FIG. 1 taken generally along Section 2—2.

FIG. 3 is a cross-sectional view of a coil assembly shown in FIG. 2 taken along Section 3—3.

FIG. 4 is a partial cross-sectional view of a brake disc shown in FIG. 1 taken along Section 4—4.

DETAILED DESCRIPTION OF THE PREFERRED EMBODIMENT

Figure 1:
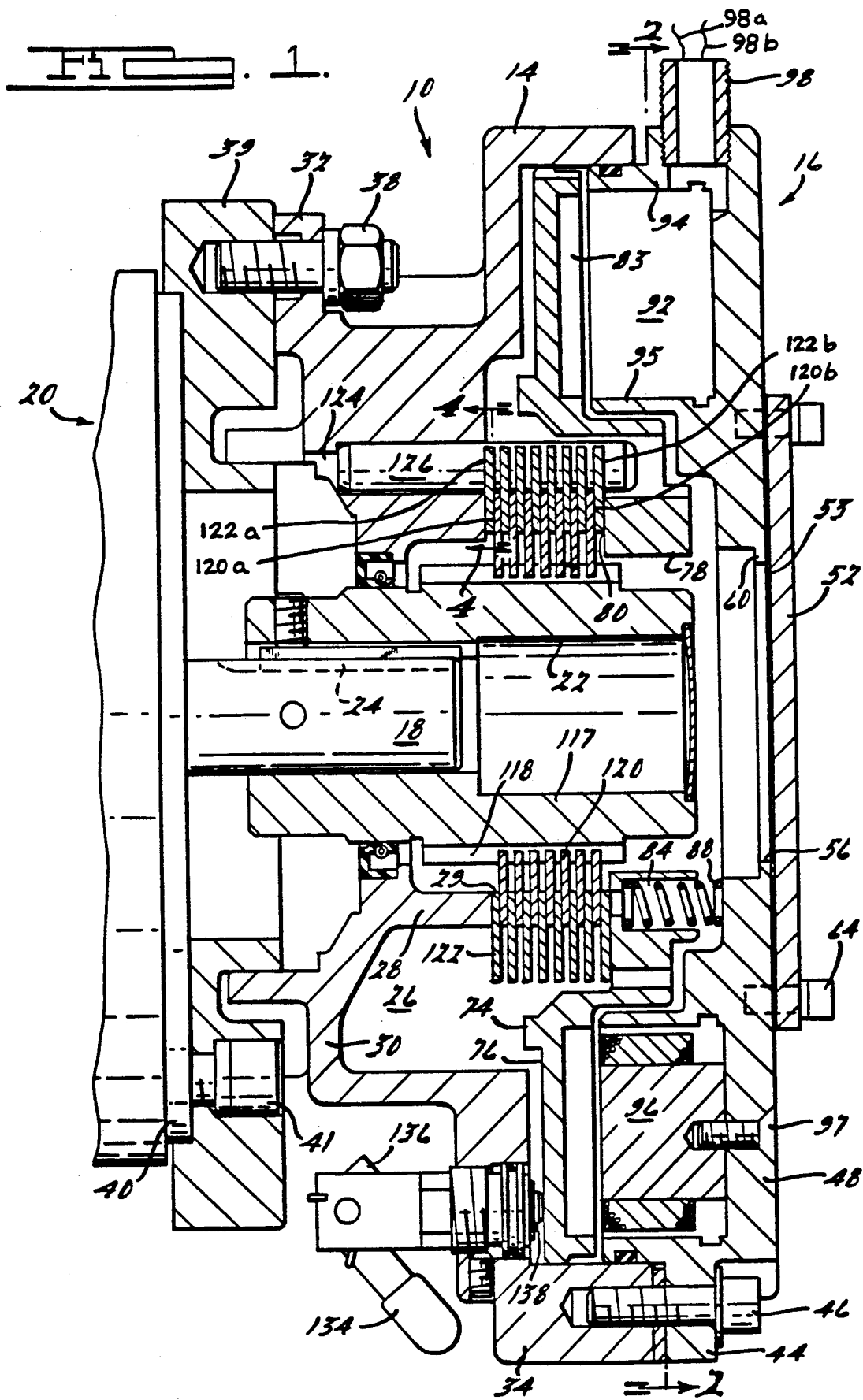
FIG. 1 is a longitudinal side elevational view, partly broken away, of a motor brake unit embodying the principles of the present invention.

Referring now in detail to the drawing, a motor brake unit 10 is shown as generally comprising an annular enclosure member 14 and a cap member 16. The enclosure member 14 is arranged axially or longitudinally of a rotatable motor shaft 18 seated within a conventional motor 20 and by a bearing assembly with which the unit 10 is operatively associated. The motor shaft 18 is surrounded by a concentrically oriented, longitudinally extending sleeve or collar 22 which is secured against rotation relative to the shaft 18 by means of a suitable longitudinally extending keyway 24. The sleeve 22 together with the enclosure member 14 and cap member 16 define an annular chamber or cavity 26 within which the brake elements of the present invention are operatively disposed, as will hereinafter be described in detail.

The enclosure member 14 comprises an abutment section 28 which defines a radially extending face 29 and is arranged radially outwardly from the collar 22 and secured to the member 14 by an integral, longitudinally and radially outwardly extending end wall 30. The member 14 also comprises a pair of radially outwardly extending, longitudinally spaced shoulders 32 and 34, the former of which serves to operatively secure the enclosure member 14 by means of a plurality of circumferentially spaced screws, bolts, or the like 38 to an annular adaptor member 39 which in turn is secured to an axially or longitudinally outwardly projecting lug section 40 formed in the end of the housing of the motor 20 by a plurality of circumferentially spaced screws, bolts, or the like 41. The shoulder 34 of the enclosure member 14 is adapted to be fixedly secured to a radially outwardly extending annular flange section 44 of the cap member 16 by means of a plurality of circumferentially spaced, axially extending screws, bolts, or the like 46, which results in the cap member 16, as well as the member 14, being fixedly secured against relative rotation with respect to the housing of the motor 20.

While one axial end of the chamber or cavity 26 is closed by the end wall section 30 of the enclosure member 14, the opposite end of said cavity 26 is closed by the end wall member 48 of the cap member 16. The end wall member 48 is formed with a central annular opening 56, defining an annular shoulder 60 is covered by an end cap 52 and sealed by an appropriate gasket 53 which are fastened to the end wall 48 by screws 64. Optional accessories, such as a pulley assembly (not shown), may replace the end cap 52 and may be seated against the shoulder 60 and held in rotating engagement upon the shaft 18 by a collar with inwardly tapering sleeve and captively held by a shaft cap.

Disposed interiorly of the enclosure member 14 is an annular pole piece, generally designated 74, which comprises a main body portion 76 that is arranged coaxially of and spaced radially outwardly from the collar member 22 and motor shaft 18. Extending from the pole piece 74 radially inwardly is an abutment section 78 that defines a radially extending abutment face 80 and which is provided with a plurality of circumferentially spaced, axially extending annular bores or recesses, generally designated 84, which are adapted to nestingly receive a plurality of helical coil springs, one of which is shown in FIG. 1 and designated by the numeral 88. It will be seen that the plurality of springs 88 function to resiliently urge or bias the pole piece 74 toward the left in FIG. 1, whereby the face 80 of the pole piece 74 will function to effect a braking action on the motor shaft 18, in a manner hereinafter to be described. The axially opposite (outer) end of the pole piece 74 is formed with an annulus 83. The annulus 83 contains a chemically bonded magnetically attractive laminate. In order to assure against fluid leakage from the cavity 26, suitable sealing means is provided to permit longitudinal reciprocal movement of the pole piece 74 and rotation of the shaft 18 and collar member 22 while preventing any fluid egress from the cavity 26.

Means for selectively actuating or reciprocating the pole piece 74 is provided by a plurality of electromagnetic coils 96 which are activated by an externally switched power source (not shown) communicating with the coils 96 by wires 98a and 98b passing through a threaded plug 98 in the exterior wall 94 of the cap member 16. The electromagnetic coils 96 are seated within an annular recess 92 of the cap member 16 defined by the exterior wall 94 and the internal sleeve 95. When an AC current is applied to the electromagnetic coils 96, activating the coils, the laminate of the pole piece 74 is attracted toward the coils 96, overcoming the biasing force of the coil springs 88 and pulling the pole piece 74 axially away from the motor.

The electromagnetic coils 96 are circumferentially arranged in the annular recess 92 as is best illustrated in FIG. 2. Each coil comprises an E-shaped laminate member consisting of a backing plate 66, end arms 67 and 68, and a center arm 69, which has wire 65 coiled thereupon (as illustrated in FIG. 3). Coils may also be formed upon a bobbin (not shown) with an elongated opening in the center which may be inserted over the center arm 69. Preferably, the bobbin would have an annular ring to divide the winding into two portions. The coil assemblies may be held in place by a screw 97 or may be "potted" in the annular recess 94 by a non-conductive material such as epoxy. The epoxy will entirely fill the annular recess 92 and cover the electrical connection between coils. The coils 96 are three phase AC coils which require no rectification and are therefor very responsive and fast in operation. Further, the coils 96 are preferably operated on 460 volts AC so that the brake may be electrically connected in parallel with the motor.

The collar 22 is formed with a radially outwardly extending section 117 which defines an external spline formation 118 adapted to operatively support a plurality of axially spaced, radially outwardly extending friction elements or discs, generally designated by the number 120, the friction disks having oppositely facing faces 120a and 120b in a manner such that the discs 120 are free to move axially along the collar 22, yet are prevented from rotating relative thereto. Disposed interjacent or interleaved between the plurality of the friction discs 120 is a second plurality of friction elements or plates 122 (shown in FIG. 4), each having oppositely facing faces 122a and 122b. When mounted in the brake unit, the faces 120a and 122a are facing and the faces 120b and 122b are facing one another. In the embodiment shown the friction disks 120 are sandwiched between a pair of friction plates 122 such that the first face 122a of one friction plate, shown to the left of the stack) is positioned to engage radially extending face 29 and the second face 122b of another friction plate 122 (shown to the far right) is positioned to engage abutment face 80. The friction elements 122 are each formed with four recesses 123 adapted to slidingly engage four axially extending retaining dowels 126 that are press fit into bores 124 in the end wall 30. The dowels 126 are adapted to support the plurality of friction plates 122 for longitudinal sliding movement, yet prevent any relative rotation of said plates 122 with respect to the enclosure member 14. The plates 120 and plates 122 are fabricated of a suitable brake material well known to those skilled in the art and are adapted to function in a manner hereinafter to be described to effect a braking action on the motor shaft 18 and hence upon the associated motor 20 upon preselected actuation of the pole piece 74.

The present invention can serve the purpose of several brakes. The specified torque of the brake can be altered in the field by simply rearranging the existing disc pack. The ability of the brake to act as a momentary torque limiter is highly beneficial to certain machine and slide operations in preventing the development of excessive thrust due to signal delay. In most instances excessive thrust results in metal fatigue and eventually broken machine components.

The interior of the cavity 26 is adapted to be filled with a fluid cooling medium, such as oil, which functions in a manner such that a substantially high percent of the heat produced due to interaction between the friction discs 120 and plates 122 during a braking operation is transmitted or conducted directly to the enclosure member 14 and the cap member 16, whereby to effectively transmit such heat away from the interior of the motor brake unit 10. The particular configuration of the members 14 and 16 will be found to effect sufficient agitation or circulation of the cooling fluid (oil) so that sufficient heat transfer will be achieved without requiring any ancillary means for circulating said fluid, such as a fluid pump or the like.

Referring now to the overall operation of the motor brake unit 10, assuming the initial conditions that the interior of the cavity 26 is properly filled with a cooling fluid, the plurality of coil springs 88 will normally function to bias the pole piece 74 toward the left in FIG. 1, whereby the face 80 will exert a leftwardly directed force against the plurality of friction discs 120 and plates 122, with the result that said discs 120 and plates 122 will be compressed between the faces 80 and 29 so that an effective braking action is exerted against the motor shaft 18. At such time as it is desired to operate the motor, the braked condition is relieved by connecting the source of electricity to the coils 96 at the same time that the current is connected to the motor to start motor operation. The coils will then magnetically attract the pole piece 74 longitudinally toward the right in FIG. 1 against the resistance of the plurality of springs 88. Such longitudinal movement of the pole piece 74 will effect rightward movement of the face 80, resulting in disengagement of the same from the axially outermost of the friction plates 122, thereby releasing the shaft 18 to permit operation of the motor 20. When it is again desired to effect braking of the motor 20, the electromagnet is deactivated, with the result that the plurality of springs 88 will bias the pole piece 74 toward the left in FIG. 1, resulting in the face 80 thereof moving into engagement with the friction plates 122 and causing all of the friction discs 120 and plates 122 to be compressed between the faces 80 and 29. Additionally, the effective braking force may be controlled by adding or removing one or more springs 88, as will be apparent.

The brake unit may be manually disengaged through a threaded screw means or a manual release toggle 134 to overcome the biasing force of the coil springs 88 and translating the pole piece 74 axially to the right in FIG. 1. The manual release toggle 134 has a cam plate 136 which will drive the manual release rod 138 axially outward against the pole piece 74 when activated.

While it will be apparent that the preferred embodiments illustrated herein are well calculated to fulfill the objects above stated, it will be appreciated that the present invention is susceptible to modification, variation and change.

I claim:

1. A brake for an electrical motor of the type having a rotatable and axially non-movable motor shaft, comprising a housing defining an enclosed chamber for receiving a viscous fluid, said housing having a first end connected to said motor and a second end axially spaced from said motor and from said first end, brake means, said brake means comprising a magnetizable pole piece axially movable relative to said shaft between a first position to prevent the shaft from rotation and to a second position wherein the shaft is permitted to rotate, a spring for normally biasing said pole piece into said first position, and an electromagnetic flux generating means, electrically connectible to the electrical circuit of said motor, for generating magnetic flux which acts on said pole piece to retract the pole piece against the biasing effect of said spring, said flux generating means comprising a plurality of generally axially extending, stationary, angularly spaced, electrical coils mounted on the second end of said housing.

2. The invention as recited in claim 1 wherein each of said electrical coils is mounted on a respective generally E-shaped support member comprising a base secured to said second end, and three posts extending vertically from said base so as to be extending axially, said electrical coils being formed by an electrical wire being coiled about the centermost of said posts and said electrical wire being in direct electrical communication with the motor.

3. The invention as recited in claim 2 wherein said housing is removably mounted as a unit from said motor and said coils are laminated to the center posts by an epoxy.

4. The invention as recited in claim 1 wherein said magnetizable pole piece is plate-like and substantially coextensive with the inner wall of the housing, said coil spring is axially spaced from said motor and acts normally to bias said pole piece towards said motor, and said pole-piece includes a generally U-shaped annulus disposed in confronting relation with said electrical coils, said annulus including a laminate of magnetically attractive material.

5. The invention as recited in claim 4 wherein said brake means comprises a friction disk mounted to said shaft and constrained to rotate therewith, and a friction plate mounted non-rotatably to said housing, the disk and plate being disposed in said chamber and each having a first and second face, said first faces being adapted to engage and disengage when the pole piece is in the respective first and second positions, and said spring normally biasing said pole piece to said first position and normally engaging the second face of said friction disk and causing the second face of said friction plate to be driven into abutment with the first end of said housing.

6. The invention as recited in claim 1 including manual release means connected to at least a portion of the first end of said housing and directly operable against said pole piece for manually disengaging said pole piece from braking relation.

7. The invention as recited in claim 6 wherein said manual release means includes a bushing fixedly mounted to the first end of said housing, a drive shaft mounted for reciprocation in said bushing and having one end thereof extending into said enclosure and adapted to engage said pole piece, and a lever connected to the other end of said drive shaft to selectively drive said one end into and out of engagement with said pole piece.

8. A precision electromagnetic brake comprising a housing forming an enclosed chamber for receiving a viscous fluid shear medium and including first and second end walls, a shaft extending through one end wall of said housing, electric motor means for rotating said shaft, a friction disk means including a first friction disk connected to said shaft for rotation therewith and a second friction disk nonrotatably mounted to said housing, said disk means defining a first face engageable with the one end wall of said housing and a second face, a pole piece having a bearing surface normally biased into engagement with said second face whereby to drive said first face into frictional engagement with the one end wall and prevent rotation of the shaft and a magnetizable portion, and electromagnetic flux generating means axially spaced from the end of said shaft and confronting said magnetizable portion.

9. A precision electromagnetic brake comprising an enclosed housing for receiving a viscous fluid medium and having first and second end portions disposed in axially spaced relation whereby to form opposite respective ends of the housing, said first end portion defining a first brake face, a shaft extending through said first end portion and adapted to be driven by an electrically energizable motor, rotation preventing means adjacent said first end portion to prevent rotation of said shaft, said preventing means comprising a friction disk means extending radially from said shaft and rotatable therewith, said disk means defining a second brake face which confronts said first brake face and a third brake face, a pole piece mounted for axial movement relative to said shaft and located between said rotation preventing means and said second end portion, said pole piece having a fourth brake face which confronts said third brake face and an annulus of magnetic material, a spring extending axially from said second end portion for normally biasing said faces together and into compressed relation whereby to prevent rotation of said disk means, electromagnetic flux generating means for generating electromagnetic flux which acts on said magnetic material to overcome the biasing effect of said spring and to axially retract said pole piece so as to cause disengagement of said faces, and electrical connecting means for electrically connecting the motor in parallel to the electromagnetic flux means whereby the action of retracting and braking is substantially simultaneously initiated.

10. An electromagnetically controlled motor brake unit, having an AC motor, enclosed housing and an oil shear braking arrangement, characterized by said housing having a first end connected to said motor and a second end spaced from said motor, and actuation means for causing an annular pole piece to reciprocate axially between braked and unbraked positions, said actuation means including a magnetically attractive portion arranged annularly, and an electrical wire wrapped into a plurality of cylindrical coils in confronting relation to said magnetically attractive portion, the axis of each coil cylinder extending axially and the respective coil axes being arranged in a circle and mounted on the second end of said housing, respective energization and de-energization of said coils and motor by an electrical source being substantially simultaneously.

11. The invention as recited in claim 10 wherein said enclosed housing forms an enclosed chamber for receiving oil and includes a first and a second end portion, said motor includes an axial shaft which communicates with said chamber, at least one support rod extends axially from said first end portion, said actuation means includes a coil spring that extends from said second end portion and into engagement with said pole piece, and said braking arrangement includes two sets of interengaging friction plates pressed together by said coil spring, the plates of the first set being connected for rotation with the shaft to be braked and the plates of the second set being connected to said support rod and prevented from rotation relative to said shaft.

12. An electromagnetic brake adapted to be removably mounted as a unit to the frame of a motor having a rotatable shaft to be braked, comprising a housing defining an enclosed chamber for receiving a viscous fluid and having an end wall connectible to said motor, said end wall receiving the rotatable shaft extending from said motor and forming a first brake face, a flat friction plate disposed adjacent to said brake face and connectible to said shaft for rotation therewith, a pole piece comprising an annulus of magnetizable material mounted in said housing for axial sliding motion relative to said housing and said shaft, said pole piece defining a second brake face movable towards said friction plate, a stationary electromagnet axially spaced from said end wall and disposed adjacent to said pole piece, bias means located between said electromagnet and said pole piece for normally forcing said pole piece toward said end wall and said brake faces into contact with one another whereby to prevent rotation of the shaft, said electromagnet being adapted to generate magnetic flux which operates on said magnetizable material for overcoming the biasing effect of said bias means to retract the friction plate and permit rotation of the shaft, and manual release means for releasing the shaft from braked relation, said release means comprising a toggle mounted to the end wall of said housing and a shaft in direct engagement with said pole piece, said toggle being selectively operable to drive the pole piece away from engagement with the friction plate.

13. An oil shear brake unit for use with an electric motor having a mounting end and a rotatable shaft having an end portion projecting axially outwardly from the mounting end, said brake unit comprising:

a housing assembly comprising a pair of end walls and an annular wall extending axially between and attached to both of said end walls, said housing assembly being adapted to be removably mounted as a self-contained unit onto the mounting end of said motor and forming a fluid chamber for receiving the shaft extending from said motor and a supply of oil;

fastening means for securing one of the end walls of said housing assembly to said mounting end;

a shaft sleeve having a bore to engagingly receive the shaft extending from said motor whereby to rotate therewith, said sleeve being at least partially disposed within and defining said fluid chamber;

a plurality of support rods fixedly secured to said one end wall and disposed abut said shaft sleeve;

a plurality of interleaved, axially translatable, first and second brake elements located in said fluid chamber, said first brake elements being rotatable with said shaft sleeve, and said second brake elements being connected to said support rods so as to be non-rotatably disposed relative to said housing assembly;

axially translatable piston means supported within said housing chamber for selectively causing said first and second plurality of brake elements to engage and disengage with one another, said piston means including a pole piece comprised of magnetically attractive material;

a plurality of springs disposed within said fluid chamber for normally biasing said piston means in a first axial direction towards said motor and effecting a compressed interengagement of said first and second brake elements with one another whereby to prevent rotation of the sleeve relative to the housing assembly, said springs being arranged coaxially in encircling relation about said shaft and having first ends engaging the other end wall of said housing assembly and second ends engaging the piston; and a stationary electromagnetic oil disposed in said chamber adjacent to said pole piece and on the other of said end walls, said electromagnetic coil being adapted to be electrically energized whereby to generate an electromagnetic field, said field acting to attract and draw said piston means in a direction axially opposite to said first axial direction, thereby disengaging said first and second brake elements.

* * * * *